Sept. 23, 1969  H. GEILING ET AL  3,469,231
UNDERWATER LOCATING AND INTERCOMMUNICATING DEVICE, PARTICULARLY
FOR FREE-SWIMMING DIVERS
Filed July 20, 1967  2 Sheets-Sheet 1
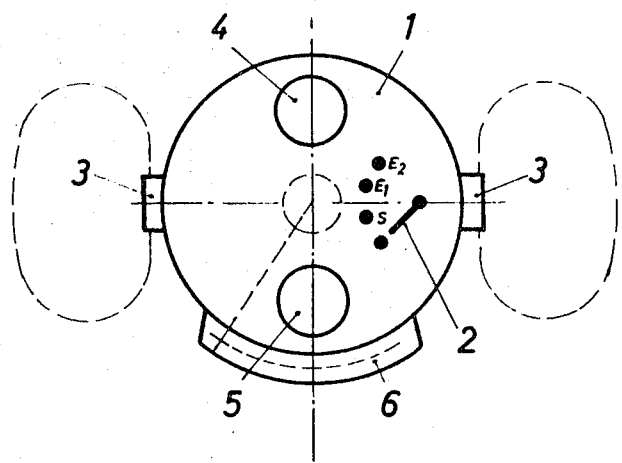
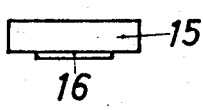
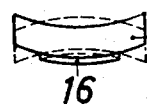
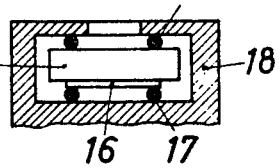
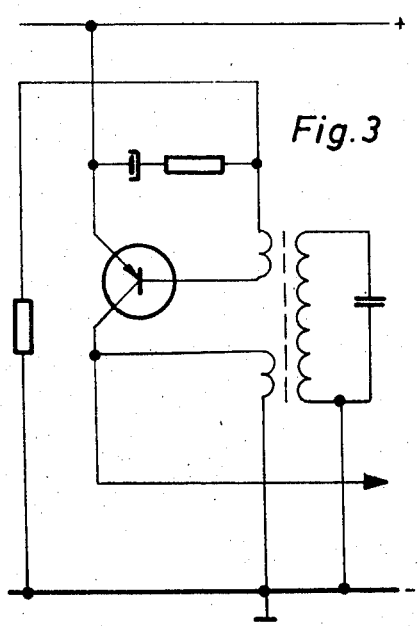
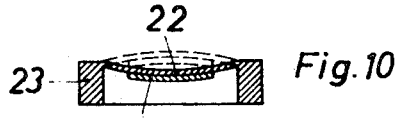
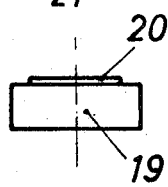
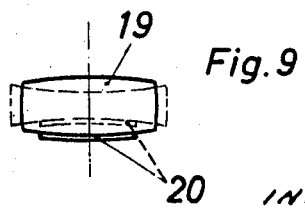
INVENTORS:
HERMANN GEILING,
PAUL WEBERLING
by Jacob L. Kollin
ATTORNEY

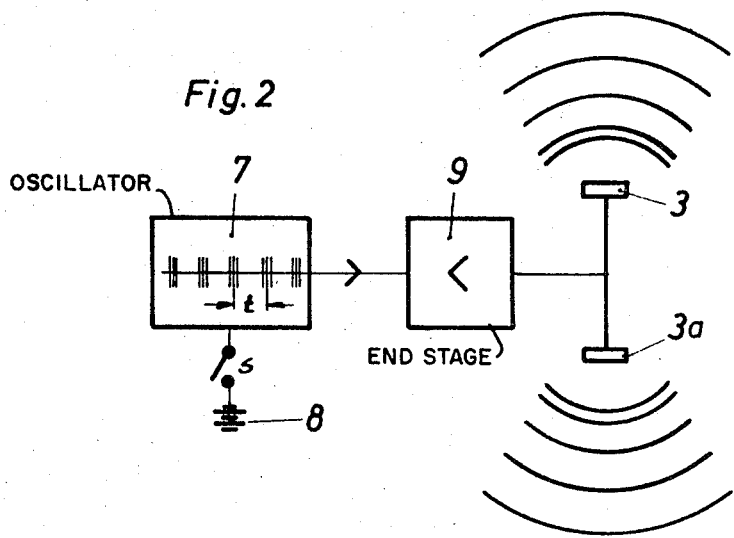
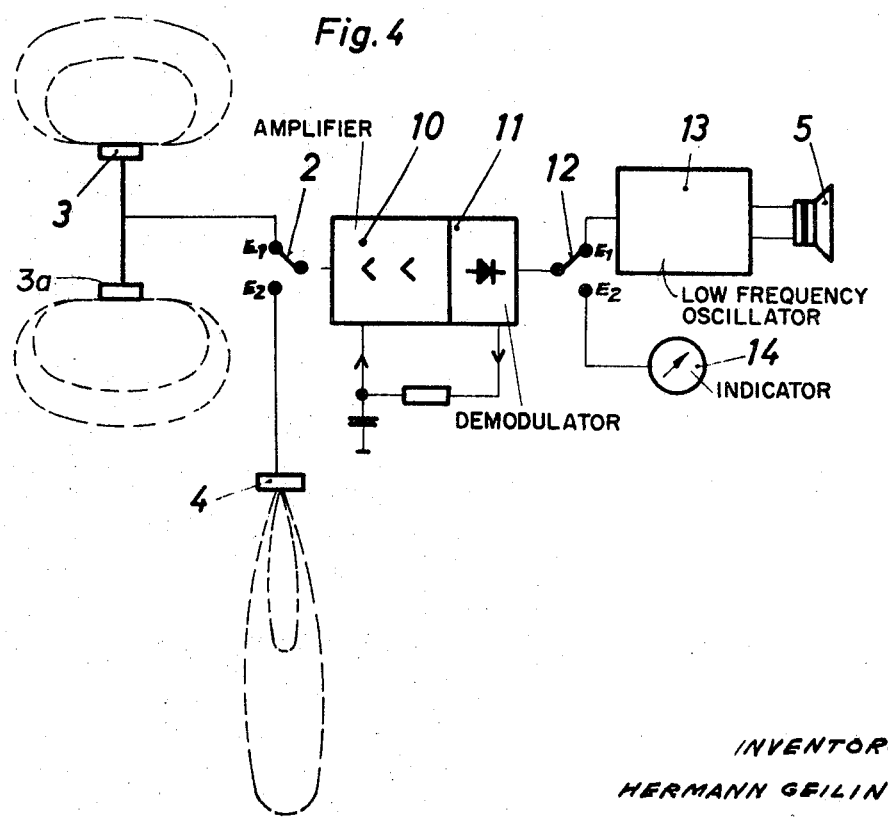

3,469,231
UNDERWATER LOCATING AND INTERCOMMUNICATING DEVICE, PARTICULARLY FOR FREE-SWIMMING DIVERS

Hermann Geiling, Sommerstrasse 8, Graefelfing, near Munich, Germany, and Paul Weberling, Sundergaustrasse 160, Munich, Germany
Filed July 20, 1967, Ser. No. 654,936
Claims priority, application Germany, July 22, 1966, G 47,502
Int. Cl. H04b 13/02
U.S. Cl. 340—6            7 Claims

ABSTRACT OF THE DISCLOSURE

A device for underwater communicating and locating; has a housing which may be carried on a diver's wrist, a modulated ultrasonic frequency wave transmitter with one or more ultrasonic radiators, which have a far-reaching spherical-shaped characteristic. An ultrasonic frequency receiver with several sonic frequency transducers which also have spherical shape characteristics but are provided with a point for locating a device, switch arranged in the housing, for alternate sending and receiving and acoustic or optical indicating elements for receiving signals and for locating a device.

Background of the invention

The invention relates to an underwater locating and intercommunicating device, in particular for free-swimming divers. Presently known equipment for free-swimming divers enables the latter to explore substantial depths. Since such diving is fraught with many dangers, it is carried out by groups of divers, when great depths of water are explored, to enable the divers to render assistance to one another. Nevertheless, one of such divers may disappear from the group's sight and may find himself beyond its assistance. Underwater telephones, connected by wire cables, are already known. These telephones restrict the freedom of movement of the divers. Wireless telephones have a limited range and can not be employed for locating purposes. There are further known devices which indicate the presence of reflecting media under water, by means of ultrasonic waves, for example, sonic depth finders for measuring depth and for fishing on the high seas. It is further known to send underwater messages and to determine the direction of incoming sonic frequency waves. Aside from their size and weight, all of these devices are incapable of accomplishing the object of this invention.

The object of the invention is to provide a small, handy device which will permit the locating of a diver by other divers and will enable them to communicate with one another.

The device for carrying out this object comprises a watertight housing which may be carried on a diver's wrist, a modulated ultrasonic frequency wave transmitter with one or more ultrasonic radiators, which have a far-reaching spherical-shaped characteristic, an ultrasonic frequency receiver with several sonic frequency transducers which also have spherical shape characteristics but are provided with a point for locating a device, a switch arranged in the housing, for alternate sending and receiving and acoustic or optical indicating elements for receiving signals and for locating a device.

In the accompanying drawing, illustrating a preferred embodiment of the invention, in connection with the following description, FIG. 1 is a schematic representation of the device;

FIG. 2 is a schematic representation of the ultrasonic transmitter;

FIG. 3 is a circuit diagram of the transmitter-oscillator;

FIG. 4 illustrates, schematically, the arrangement of the ultrasonic receiver;

FIGS. 5 to 9 illustrate a pair of ultrasonic transducers and

FIG. 10 shows an indicating element for acoustic signals.

As shown in FIG. 1, the device comprises a watertight housing 1, of the shape of a flat, round box which is small enough to be secured to a diver's wrist, without restricting his movements. An ultrasonic transmitter and receiver, mounted in the housing, may be switched on alternately by means of the switch 2, mounted on the housing. A pair of piezoelectric ultrasonic transducers 3, 3a, are arranged on the opposite sides of the housing and these serve both for sending and receiving ultrasonic waves. A third ultrasonic transducer 4, for receiving and a loudspeaker 5, for detecting acoustic signals are arranged on the top of the housing. An indicating instrument is arranged in the device, for locating other devices, said instrument being provided with a scale 6, on the top of the device, which may be read at a glance.

As shown in FIG. 2, the transmitter consists of an oscillator 7, energized by a battery 8 and which produces an alternating current voltage of a suitable ultrasonic frequency. The high frequency alternating current voltage is low frequency impulse-modulated by the oscillator itself, and radiated by both transducers 3, 3a, after being amplified by means of the end stage 9. These transducers have a semi-spherical characteristic, as shown in dotted lines in FIG. 1. Both of the characteristics on the opposite sides complete a nearly spherical radiation characteristic, so that the transmitter radiates with the same intensity in all directions and the device can also receive in the same range from all directions. The oscillator is of the high frequency blocking type, as shown in FIG. 3.

The construction of the receiver is shown in FIG. 4. The switch 2, in FIG. 1, is provided with a switch position S for sending and a pair of switch positions E1 and E2 for receiving, in addition to an "off" position. In the switch position E1, both transducers 3 are switched in for sending as well as receiving and enable the device to receive signals from all directions, due to their spherical characteristics. The incoming ultrasonic frequency is transduced into an impulse modulated, high frequency alternating current which is amplified in a conventional amplifier 10 and is rectified in a demodulator 11. The resulting direct current controls a low frequency oscillator 13, by means of a switch 12, coupled with the switch 2 in its "on" position E1, a low frequency oscillator 13, which oscillates only when it receives DC volage from the demodulator. The low frequency voltage of the oscillator is led to the loudspeaker 5 and is emitted by it in the form of a whistle tone which is well adapted for underwater signalling.

In the switch position E2 of the receiver, the ultrasonic transducer 4 is set for receiving. This transducer has a lobe-shaped direction characteristic shown in dotted lines and thus receives, with a slight deviation, incoming ultrasonic waves coming from a single direction. The alternating voltage is amplified and rectified and the direct voltage is led to the indicating instrument 14 through the switch 12 which is in the position E2. The scale 6 of the instrument extends laterally of the housing, as shown in FIG. 1. This instrument serves to locate a device, since the diver receiving the signal turns his forearm in such a manner that the scale indicates the maximum deviation of the indicator. In this position of the pointer, the upper side of the device which coincides with the level of oscillations of the ultrasonic transducer 4 points in the direction of the transmitter and informs the diver of the bearing direction in which he must constantly swim, to find the other swimmer. A logarithmic scale division and thus a similar indication of the maximum bearing may be effected by an appropriate regulation.

It is also possible to achieve an acoustic signal, in a simple manner, by employing the direct voltage pulsating with the modulation frequency at the output of the demodulator 11, directly, for actuating a mechanical sonic device, for example, a buzzer. Furthermore, an optical signal may be used instead of an acoustic signal, for example, a bearing instrument or a glow lamp. Conversely, the location of a device may be effected in another manner, for example, by means of an acoustic signal in which the loudest tone indicates the maximum bearing.

The indication, as well as the location of a device may be effected by means of an acoustic or optical indicating element or an acoustic indicator may be used, for the former, and an optical indicator for the latter.

Another known modulating means may be chosen for modulating the transmitter. However, the impulse modulation in this special type of employment is advantageous, in that no static waves can form in the underwater space which would affect adversely the locating effort. Furthermore a higher capacity value is achieved, with the least expenditure of current, thus making it possible to keep the dimensions of the device small. The width of an impulse is so small, that a reflection from the water's surface occurs only after the directly arriving impulse reaches the receiver. Additionally, there is provided an automatic amplitude regulation for suppressing of possibly arriving weakened reflection impulses. The regulation time constant of the amplitude regulation must be large, as against the time interval ($t$, FIG 2) of the individual amplitudes.

FIGS. 5–7 illustrate an ultrasonic transducer 3 with a semi-spherical direction characteristic, which serves both for sending and receiving. FIG. 5 shows the transducer in a state of rest, FIG. 6 while oscillating, and FIG. 7, the construction of the transducer. The semi-spherical characteristic is formed because the radiating diameter of the transducer, drawn on an enlarged scale, is small, as against the wavelength of the ultrasonic oscillations. The transducer consists of an aluminum disk 15 and a piezoelectric ceramic plate 16 and is constructed as a flexible oscillator for production reasons only. The disk oscillates in a circular support, on a pair of rubber rings 17 in a chamber 18. The chamber is provided with a central opening for the passage of ultrasonic waves. In this manner, the edge oscillating in counterphase to the center can not give off energy into the water, which would unfavorably change the direction characteristic.

The ultrasonic wave transducer employed in the locating device with a lobe-shaped direction characteristic is shown in a rest condition in FIG. 8 and in an oscillating condition in FIG. 9. The transducer which likewise consists of an aluminum disk 19 and a ceramic plate 20 is designed as a thick oscillator, as shown in FIG. 9, illustrating two end positions of an oscillation. The lobe-shaped direction characteristic is due to the diameter of the piston-like oscillating surface, which is greater than the wavelength of the ultrasonic oscillation.

The loudspeaker 5, shown in FIG. 10 in an oscillating condition, is likewise a piezoelectric oscillator. An aluminum membrane 2, secured to the ceramic plate 21, oscillates in a ring 23. However, a loudspeaker designed according to another principle may also be used.

The device operates as follows: All the divers of a group set their devices for receiving, in the switch position E1, in which they can receive from any direction. Should now one of the divers desire to call to the attention of the others that he is at too far a distance from them, or that he is in danger and needs help, he will switch to the position S, for sending. This will cause the devices of the other divers to emit a whistle tone. These divers will now adjust their devices in the switch position E2 and will swim on a constant course towards the signaling diver. It is also possible for the diver to swim towards the group after first attracting the latter's attention by his sending signal and then switching his own device to "receiving."

The device is adaptable not only for locating, but also for communication between divers located above one another. The messages can be transmited by prearranged signs or by Morse code.

We claim:

1. Device for underwater locating and communicating, for free-swimming divers, comprising a watertight housing adapted to be carried on a diver's forearm, modulated ultrasonic transmitting means in said housing, having a far-reaching spherical radiation characteristic, ultrasonic receiving means in said housing, including a pair of ultrasonic transducers and having a spherical direction characteristic in combination with a third ultrasonic transducer for locating a transmitting device, switch means in said housing for alternately switching in said pair of ultrasonic transducers and said third ultrasonic transducer in the transmitting and receiving means, and indicating means operable by said receiving means for receiving signals and locating a similar transmitting means.

2. Device as claimed in claim 1, wherein said transmitting means consists of a pair of oppositely directed radiators mounted on opposite sides of said housing, each of said radiators having a semi-spherical characteristic, both said radiators forming together a spherical characteristic, said receiving means having a lobar characteristic.

3. Device as claimed in claim 1, wherein said transmitting means comprises a high frequency oscillator, said oscillator including automatic low frequency impulse modulating means.

4. Device according to claim 1, wherein said receiving means includes a demodulator and a mechanical acoustic signal means operable by modulated frequency.

5. Device according to claim 1, wherein said receiving means comprises a demodulator, a low-frequency oscillator controlled by said demodulator and a loudspeaker by said low-frequency oscillator.

6. Device according to claim 1, wherein said receiving means comprises a demodulator an optical indication means for indicating the maximum of the demodulated voltage.

7. Device according to claim 1, wherein said third ultrasonic transducer has a lobe-shaped direction characteristic.

References Cited
UNITED STATES PATENTS

| | | | |
|---|---|---|---|
| 2,798,902 | 7/1957 | Kursman et al. | 340—5 |
| 3,005,183 | 10/1961 | Mayes | 340—6 |
| 3,045,206 | 7/1962 | Ahrens et al. | 340—3 |
| 3,181,116 | 4/1965 | Gordon | 340—5 |

RICHARD A. FARLEY, Primary Examiner

U.S. Cl. X.R.

340—5